(No Model.)
S. E. CRAWFORD & T. B. WYLIE.
MEASURING LIQUIDS.
No. 536,606. Patented Apr. 2, 1895.
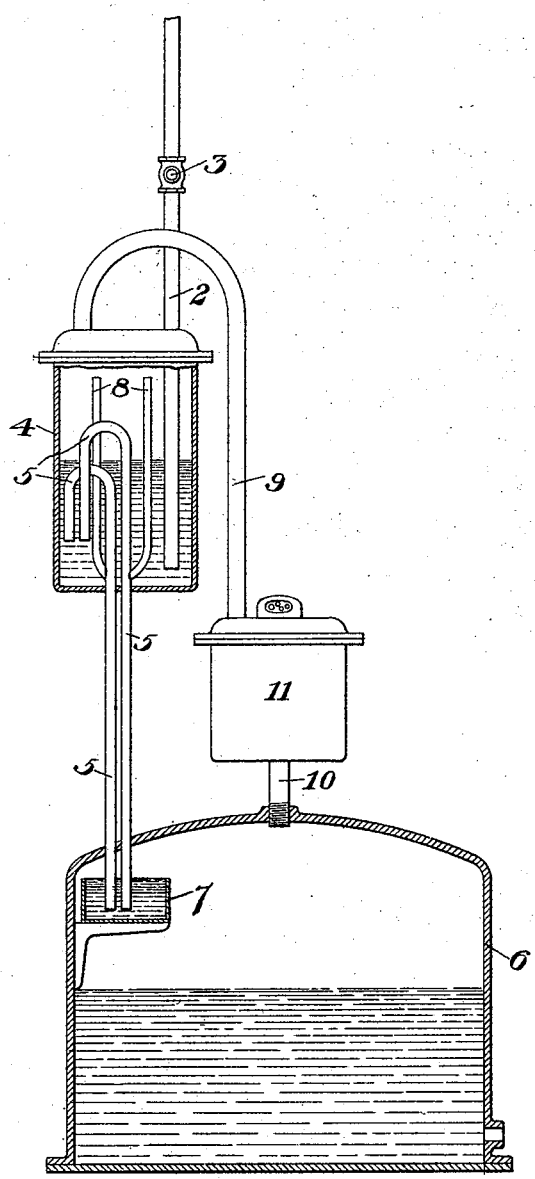
WITNESSES
INVENTOR

UNITED STATES PATENT OFFICE.

SAMUEL E. CRAWFORD, OF AVALON, AND THOMAS B. WYLIE, OF ALLEGHENY, PENNSYLVANIA.

MEASURING LIQUIDS.

SPECIFICATION forming part of Letters Patent No. 536,606, dated April 2, 1895.

Application filed June 20, 1894. Serial No. 515,084. (No model.)

*To all whom it may concern:*

Be it known that we, SAMUEL E. CRAWFORD, of Avalon, and THOMAS B. WYLIE, of Allegheny, in the county of Allegheny and State of Pennsylvania, have invented a new and useful Improvement in Measuring Liquids, of which the following is a full, clear, and exact description, reference being had to the accompanying drawing, forming part of this specification, in which the figure is a side elevation, partly in section, of our improved proportional meter.

Our invention relates to the measurement of fluids by the use of meters, and is designed to attain an improved method therefor, and also to provide a motor in which no valves are necessary and whose action is consequently not interfered with by the presence of sediment and foreign substances in the fluid.

In the drawing, 2 represents an inlet water pipe provided with a check-valve 3 and leading nearly to the bottom of an air-tight receptacle 4. Within this receptacle are provided siphons 5, whose longer legs lead downwardly through the cover of a larger air-tight receptacle 6, and terminate near the bottom of a small pan 7 supported in the upper part of the receptacle. Into the longer legs of the siphons, near the bottom of the upper receptacle and below the level of the shorter legs, lead air-pipes 8, terminating near the top of the receptacle, and from the closed tops of the two receptacles pipes 9 and 10 lead to opposite ends of a meter 11 of the usual construction for measuring air or gases. The siphons are of different height so that the water may pass therethrough successively as it rises in the receptacle.

An outlet pipe for the liquid is provided near the bottom of the lower reservoir, and the action of the device is as follows:—The water entering the upper reservoir, rises in the same until it reaches the level of the bend in the siphon, when it begins to flow therethrough into the pan 7 of the lower receptacle. In passing down through the longer leg, the water draws through the pipe 8 a quantity of air exactly proportionate to the amount of the downflowing water, and the water and air entering the pan 7 pass out into the lower receptacle, whence the water flows out through the outlet, while the air passes back through the meter 11 and again enters the top of the upper receptacle. The flow of air through the meter is caused by the unbalanced condition induced by the flowing water which, drawing air from the upper receptacle, tends to cause a vacuum therein, while the inflowing air and water raise the pressure in the lower receptacle. By measuring the air passing through the meter, this being a constant fraction of the water which draws in and carries it, the amount of water passing is easily obtained.

The advantages of the device are apparent, since no valves of any kind are used, and there is no direct measuring of the water itself. By using an elevated pan in the second receptacle, the level above the point of exit of the connecting pipe is maintained uniform.

Many variations in the form and arrangement of the parts may be made by the skilled mechanic without departing from our invention, since we consider ourselves the first to measure a flowing liquid indirectly by measuring the air taken in thereby.

We claim—

1. The method of measuring flowing liquids consisting in passing the same through a conduit having an air inlet, allowing the flowing liquid to draw in air through said inlet, and determining the amount of air drawn in thereby, giving a constant factor of the amount of liquid; substantially as described.

2. The combination with two receptacles, of an inlet pipe leading to one receptacle, a connection leading therefrom to the second receptacle, an air inlet for the connection through which the flowing liquid may draw in air, and a meter connected to the second receptacle and arranged to measure the air drawn in by the liquid; substantially as described.

3. The combination with two receptacles, of an inlet pipe leading to one receptacle, a connection leading therefrom to the second receptacle, an air inlet for the connection through which the following liquid may draw in air, and a meter connected to the upper parts of both receptacles; substantially as described.

4. The combination with two receptacles, of an inlet pipe leading to the upper receptacle, a siphon-pipe leading therefrom to the lower receptacle, an air-pipe leading to the siphon-pipe through which the flowing liquid may draw in air, and a meter connected to the lower receptacle; substantially as described.

5. The combination with two receptacles, of an inlet-pipe leading to the upper receptacle, a siphon-pipe leading therefrom to a basin supported within the second receptacle, an air-pipe leading to the siphon pipe through which the flowing liquid may draw in air, and a meter connected to the lower receptacle; substantially as described.

6. The combination with two receptacles, of an inlet pipe leading to one receptacle, a connection leading therefrom to a second receptacle, an air inlet for the connection through which the flowing liquid may draw in air, and a meter connected to one of said receptacles; substantially as described.

In testimony whereof we have hereunto set our hands.

SAML. E. CRAWFORD.
THOMAS B. WYLIE.

Witnesses:
H. M. CORWIN,
W. B. CORWIN.